(12) United States Patent
Hebert

(10) Patent No.: US 6,883,849 B2
(45) Date of Patent: Apr. 26, 2005

(54) TRUCK BED EXTENDER

(76) Inventor: Gerald Hebert, 1505 164th Ave. NE., Apt. U10, Bellevue, WA (US) 98008

( * ) Notice: Subject to any disclaimer, the term of this patent is extended or adjusted under 35 U.S.C. 154(b) by 0 days.

(21) Appl. No.: 10/446,316

(22) Filed: May 28, 2003

(65) Prior Publication Data

US 2004/0007889 A1 Jan. 15, 2004

Related U.S. Application Data

(60) Provisional application No. 60/395,464, filed on Jul. 11, 2002.

(51) Int. Cl.[7] .............................................. B62D 33/02
(52) U.S. Cl. .................... 296/26.09; 414/522; 224/403; 224/496; 224/510
(58) Field of Search .......................... 296/26.08, 26.09, 296/170, 171, 175; 312/249.8, 249.9; 226/37.6; 414/522; 224/281, 496, 510, 403, 404

(56) References Cited

U.S. PATENT DOCUMENTS

| | | | | |
|---|---|---|---|---|
| 2,545,269 A | * | 3/1951 | Ford ...................... 312/334.13 |
| 3,726,422 A | * | 4/1973 | Zelin .......................... 414/522 |
| 4,305,695 A | | 12/1981 | Zachrich ..................... 414/522 |
| 4,375,306 A | * | 3/1983 | Linder ...................... 312/249.9 |
| 4,950,123 A | * | 8/1990 | Brockhaus .................. 414/522 |
| 4,993,088 A | * | 2/1991 | Chudik ........................... 5/118 |
| 5,090,335 A | | 2/1992 | Russell ......................... 108/44 |
| 5,239,934 A | | 8/1993 | Miller et al. .................. 108/44 |
| 5,501,500 A | | 3/1996 | Cannon ......................... 296/26 |
| 5,522,685 A | * | 6/1996 | Lessard ........................ 410/121 |
| 5,649,731 A | | 7/1997 | Tognetti ........................ 296/26 |
| 5,820,190 A | * | 10/1998 | Benner ..................... 296/26.09 |
| 5,829,945 A | * | 11/1998 | Stanley ......................... 414/477 |
| 5,938,262 A | | 8/1999 | Mills ........................ 296/26.09 |
| 6,065,792 A | * | 5/2000 | Sciullo et al. ........... 296/26.09 |
| 6,491,331 B1 | * | 12/2002 | Fox .......................... 296/26.09 |
| 2004/0017096 A1 | * | 1/2004 | Crean ......................... 296/175 |

FOREIGN PATENT DOCUMENTS

JP            403086639 A  *  4/1991  .............. 296/26.09

* cited by examiner

*Primary Examiner*—D. Glenn Dayoan
*Assistant Examiner*—H. Gutman
(74) *Attorney, Agent, or Firm*—Dean A. Craine

(57) ABSTRACT

A truck bed extender that enables a user to load and unload heavy loads from a truck bed. The apparatus includes a lower frame longitudinally aligned and securely mounted inside the truck bed. Disposed inside the lower frame is a sliding intermediate frame with at least one length adjustable leg attached at its distal end that supports the distal end of the intermediate frame in an extended position. During assembly, the proximal end of the intermediate frame slides into, and extends from, the lower frame. Disposed longitudinally over the lower frame and the intermediate frame is a moveable upper frame with a support panel attached thereto. When the intermediate frame is fully extended from the truck bed, the upper frame may move longitudinally rearward from the truck bed and onto the intermediate frame so that cargo may be loaded or unloaded onto the support panel. When the truck is to be moved, the upper frame and cargo are pushed forward and onto the lower frame so that it is fully contained inside the bed. The legs are then adjusted or removed so that the intermediate frame may be pushed into the lower frame and locked in place inside the truck bed.

20 Claims, 3 Drawing Sheets

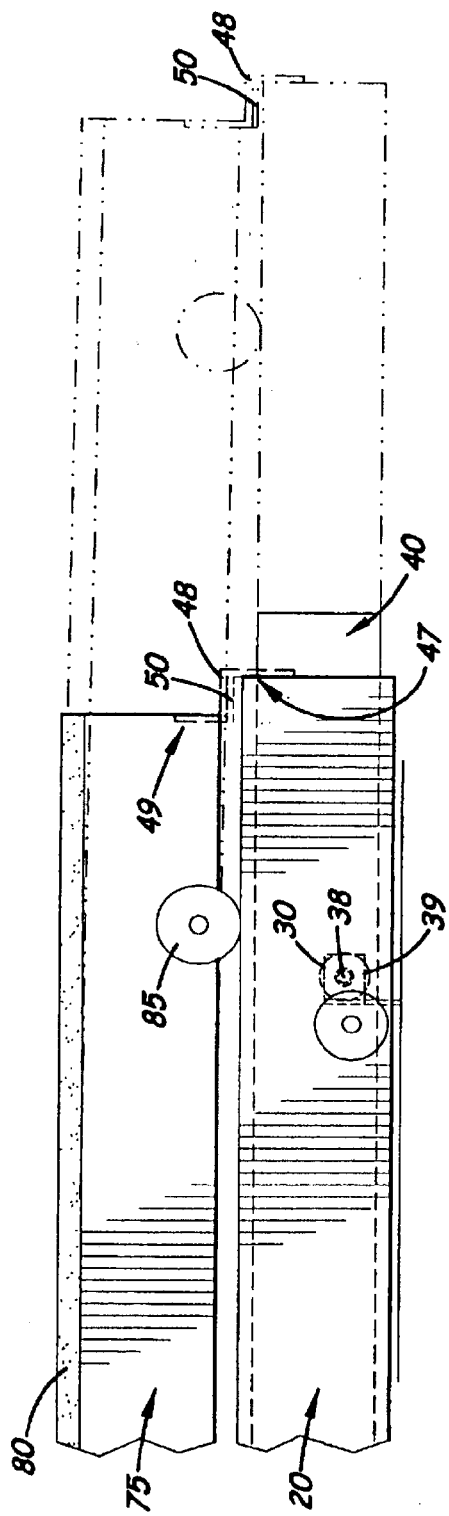
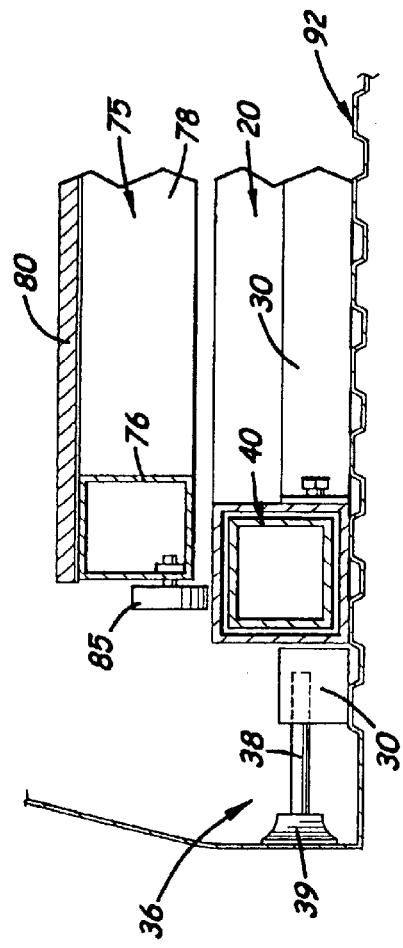

TRUCK BED EXTENDER

This is a utility patent application which claims benefit of U.S. Provisional Application No. 60/395,464 filed on Jul. 11, 2002.

BACKGROUND OF THE INVENTION

1. Field of the Invention

This invention pertains to truck bed extenders and, more particularly, to truck bed extenders that enable heavy loads to be easily loaded and unloaded from the truck bed.

2. Description of the Related Art

Truck bed extenders that provide a work surface for workers and enable cargo to be easily loaded and unloaded from the truck bed are found in the prior art. Some extenders use a lower frame fixed to the truck bed, an intermediate frame that telescopingly slides over the lower frame to a partial extended position from the truck bed, and an upper frame that telescopingly slides over the intermediate frame to partially extend from the truck bed. A support platform is securely attached to the upper frame upon which cargo is loaded and unloaded when the upper frame is extended from the truck bed. Attached to the distal end of the upper frame is a pair of legs that are used to support the end of the upper frame when the upper frame is extended from the truck bed.

One drawback with truck bed extenders found in the prior art is that they are not sufficiently constructed to load and unload heavy cargo on the support platform when extended from the truck bed. While on some truck bed extenders, telescopic legs may be used to temporarily support the distal end of the support platform, when the support platform is moved into the truck bed, the legs must be removed. When the legs are removed, the user must temporarily support the distal end of the support platform and push it into the truck bed. Unfortunately, the truck may be parked on an incline, or the cargo may be too heavy for a user to support and move into the truck bed.

SUMMARY OF THE INVENTION

It is an object of the present invention to provide a truck bed extender that can be mounted to the existing bed of a pickup truck.

It is another object of the present invention to provide a truck bed extender that allows cargo to be easily lifted onto a support platform that moves from a stored position inside the truck bed to an extended position from the rear of the truck bed without the user having to temporarily support the distal end of the support platform.

It is another object of the present invention to provide a truck bed extender that does not require the user to temporarily lift the distal end of the support platform when moving the support platform from an extended position to a store position.

These and other objects of the present invention will become apparent are met by a truck bed extender that includes a lower frame located longitudinally and fixed inside the bed of a truck. Longitudinally extendable from the lower frame is an intermediate frame that moves longitudinally to the lower frame from a retracted position to a rearward extending position from the back of the truck bed. Disposed on top of the intermediate frame is an upper frame that selectively moves longitudinally over the lower frame when the upper frame is in a retracted position in the bed and moves longitudinally over the intermediate frame when the intermediate frame is moved to an extended position.

The lower, intermediate, and upper frames are designed to fit completely into the truck bed between the wheel wells. A truck bed attachment means is provided for attaching the lower frame to the truck bed. In the preferred embodiment, the truck bed attachment means is a pair of clamping members located near the front and rear ends of the lower frame which are forced outward and press against the inside surfaces of the truck bed to securely hold the lower frame in place. The clamping members enable the apparatus to be used without modifying the truck bed. Because the distal end of the upper frame does not need to be supported when moving the upper frame into the bed, the clamping members are not required to prevent upward rotation of the front edge of the lower frame during use.

When the intermediate frame is extended from the truck bed, a pair of adjustable legs are attached to its distal end that extend downward to support the distal end of the intermediate frame over the ground. A support panel is attached over the upper frame which is used as a loading platform or as a table/work station. When the support panel is extended from the truck bed and heavy cargo is placed near the distal end of the support panel, the upper frame can then be easily moved over the intermediate frame and onto the lower frame between retracted and extended positions. Optional locking mechanisms are used between the lower and intermediate frames and between the upper frame and the truck bed that enable the user to lock the intermediate and upper frames in an extended position from the truck bed.

The legs on the intermediate frame are also designed to be removed or moved to a retracted position so that the intermediate frame may be retracted into the lower frame.

DESCRIPTION OF THE DRAWINGS

FIG. 3 is a side elevational view of the invention.

FIG. 4 is a section elevational view taken along line 4—4 in FIG. 2.

DESCRIPTION OF THE PREFERRED EMBODIMENT(S)

Figure 1:
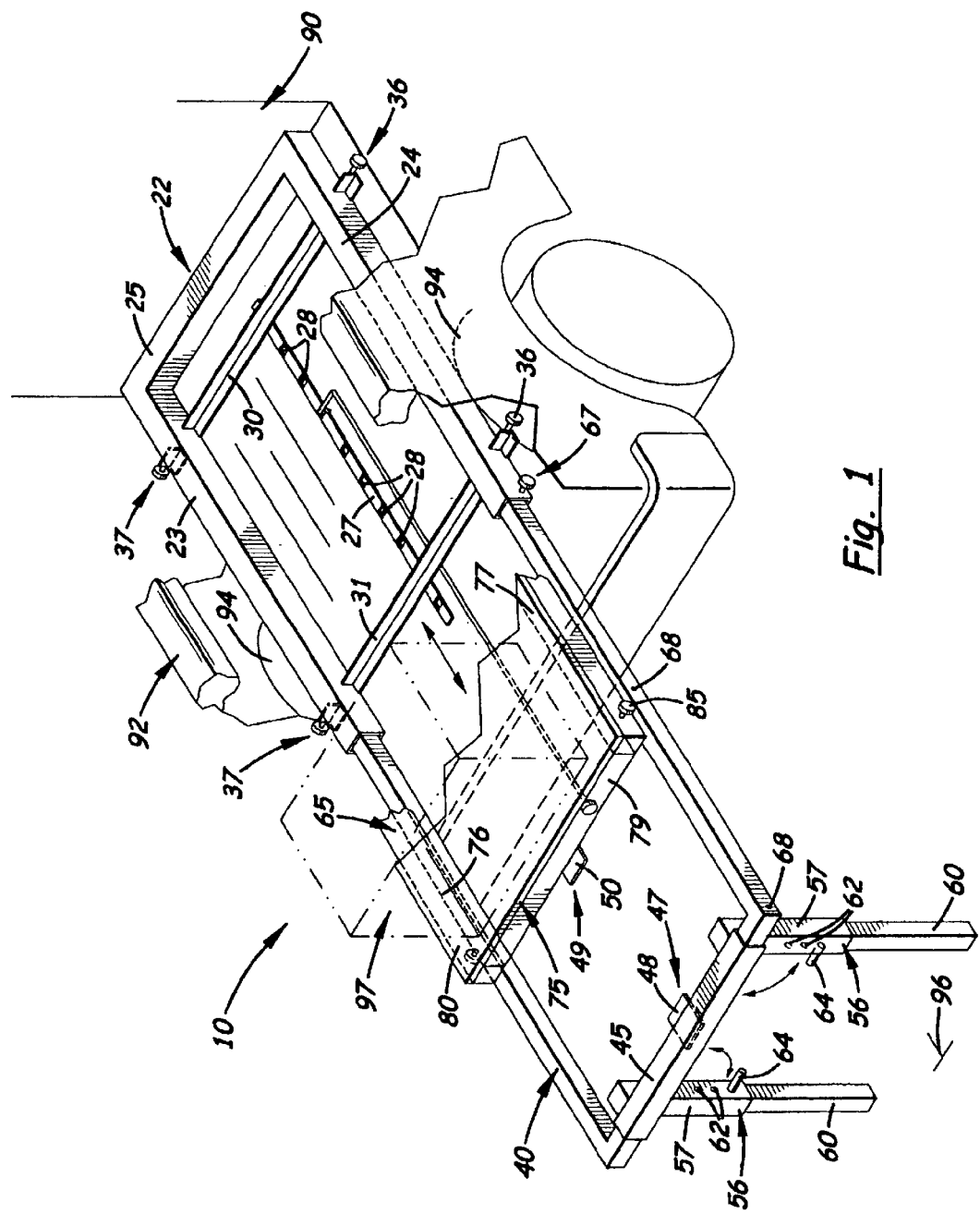
FIG. 1 is perspective view of the truck bed extender.
Figure 2:
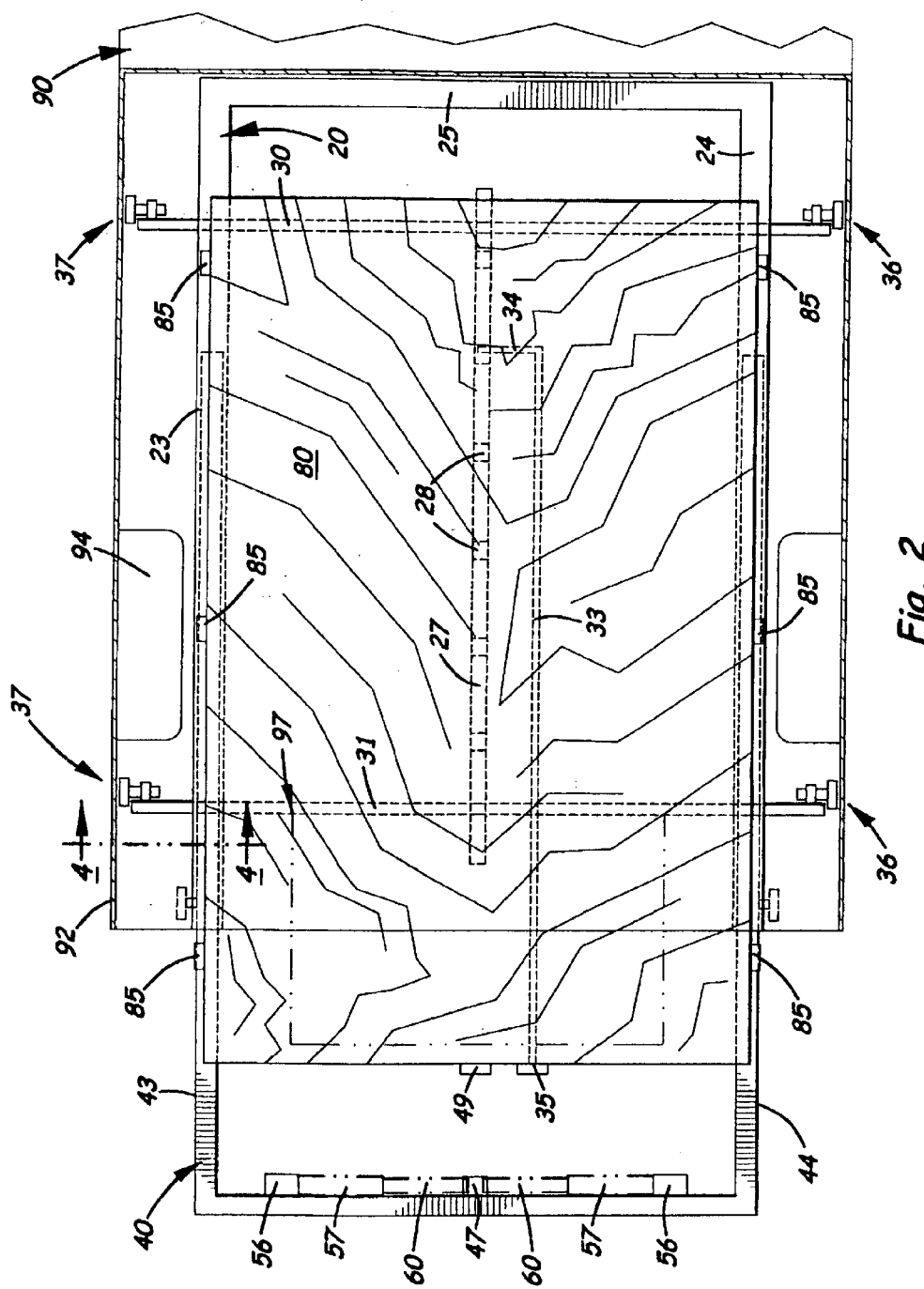
FIG. 2 is a top plan view of the invention.

Shown in the accompanying FIGS. 1–4 is a truck bed extender 10 that includes a lower frame 20 located longitudinally and fixed inside the bed 92 of a truck 90. Longitudinally extended from the lower frame 20 is an intermediate frame 40 that slides longitudinally from a longitudinally aligned, retracted position inside the lower frame 20 to a rearward extending position from the lower frame 20. Disposed on top of the intermediate frame 40 is an independently moveable upper frame 65 that selectively moves over the lower frame 20 when the lower frame 20 is disposed in a retracted position, and over the intermediate frame 40 when the intermediate frame 40 is moved to an extended position. The lower, intermediate and upper frames 20, 40, 65, respectively, when fully retracted, are designed to fit completely into the truck bed 92 between the wheel wells 94. When the intermediate frame 40 is extended from the truck bed 92, adjustable legs 56, attached to the distal end of the intermediate frame 40, extend downward to support the distal end over the ground 96. A support panel 75 attached over the upper frame 65, is used as a loading platform or a table/work station. When the intermediate frame 40 is extended from the lower frame 20, cargo 97 may be placed onto the support panel 75 which can then be easily moved over the intermediate frame 40 and the lower frame 20 between retracted and extended positions.

The legs 56 may be removed or folded on the intermediate frame 40 so that the intermediate frame 40 may be retracted into the lower frame 20. Means for locking the intermediate and upper frames 40, 65, respectively, inside the truck bed 92 are also provided.

In the preferred embodiment, the lower frame 20 includes a U-shaped frame component 22 with two longitudinally side members 23, 24 and a front transverse member 25 connected to the forward ends of the two side members 23, 24. The side members 23, 24 are hollow and designed to receive the lateral members 43, 44 on the intermediate frame 40. In the preferred embodiment, the side members 23, 24 and front transverse member 25 are made of 2"×2" steel tubing welded together. Attached to the rear ends of the lateral members 43, 44 is a rear transverse member 45. The lateral members 43, 44 are slightly smaller and complementary in shape to the side members 23, 24 and designed to slide freely inside the side members 23, 24. In the preferred embodiment, the lateral members 43, 44 and rear transverse member 45 are made of 1¾-inch steel tubing.

A truck bed attachment means is used to attach the lower frame 20 to the bed 92. In the preferred embodiment, the truck bed attachment means is two pairs of clamping members 36, 37 attached to the opposite ends of transversely aligned bars 30, 31, discussed further below. Each clamping member 36, 37 includes a threaded bolt 38 with a protective cap 39 attached to its distal end. During use, the bolt 38 is adjusted in length so that the cap 39 presses against the inside surfaces of the bed 92 to securely hold the lower frame 20 in place. One advantage of using the clamping members 36, 37 is that the truck bed extender 10 may be used on different truck bed widths and does not require modification of the bed 92.

At least one length adjustable leg 56 (two shown) is attached to the rear transverse member 45. In the preferred embodiment, each leg 56 includes an upper section 57 that is pivotally connected at its upper end to the rear transverse member 45. During operation, the upper section 57 moves from a horizontally aligned position to a perpendicular, downward extending position. Extending from the lower opening of the upper section 57 is a telescopic lower section 60. Holes 62 are formed on the upper and lower sections 57, 60, respectively, that are engaged by a pin 64 that enables the length of the legs 56 to be adjusted.

Attached to each side member 23, 24 near the rear ends is an adjust knob 67 which engages holes 68 formed on the sides of the side members 23, 24. In the preferred embodiment, each side member 23, 24 has three holes 68 located near the rear end, the front end, and at the mid-line axis. During use, the knobs 67 are used to hold the intermediate frame 40 inside the lower frame 20 or used to hold the intermediate frame 40 in a partial or fully extended position therefrom.

The upper frame 65 is rectangular-shaped with two side members 76, 77 and front and rear transverse members 78, 79 and is covered by a planar support platform 80. Attached to each side member 76, 77 is at least two wheels 85 (three shown) evenly spaced apart thereon that enable the upper frame 65 to roll over the top surfaces of the lower frame 20 and the intermediate frame 40 during use. In the preferred embodiment, the side members 76, 77 and front and rear transverse members 78, 79 are made of 1½-inch square tubing material. The support platform 80 is made of ¾-inch plywood.

Disposed between the upper frame 65 and the bed 92 is an optional locking mechanism used to selectively lock the upper frame 65 in position on the bed 92. In the preferred embodiment, the locking mechanism includes a flat bar 27 aligned longitudinally and centrally on the top surface on the bed 92. The ends of the flat bar 27 are attached to two transversely aligned bars 30, 31 that extend between the two side members 23, 24. Formed on the top surface of the flat bar 27 is a plurality of raised elements 28. Aligned and attached to the upper frame 65 is an L-shaped turn rod 33. Attached to the proximal end of the turn rod 33 is a tongue member 34 and attached to the distal end of the turn rod 33 that extends from the rear surface of the upper frame 65 is a turn handle 35. During use, the turn handle 35 is rotated which moves the tongue member 34 between a blocking and non-blocking positions against the raised elements 28 to prevent or allow movement of the upper frame 65 inside the bed 92.

Also provided is a means for limiting the rearward movement of the upper frame 65 on the intermediate frame 40. In the preferred embodiment, the means for limiting the rearward movement are two L-shaped angle members 47, 49 attached centrally to intermediate and upper frames 40, 65, respectively. The angle members 47, 49 are aligned so that their longitudinally aligned flanges 48, 50, respectively, overlap and block excessive rearward movement of the upper frame 65 over the intermediate frame 40.

In compliance with the statute, the invention described herein has been described in language more or less specific as to structural features. It should be understood, however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A truck bed extender, comprising:
   a. a lower frame disposed inside a truck bed, said lower frame including two hollow side members longitudinally aligned on opposite sides of the truck bed;
   b. means to attach said side members to a the truck bed;
   c. an intermediate frame longitudinally aligned with said lower frame, said intermediate frame including two longitudinally aligned lateral members that slide into said side members on said lower frame enabling said intermediate frame to move between a retracted position and an extended position from the truck bed;
   d. at least one length adjustable support leg attached to said intermediate frame to support said intermediate frame on a support surface when moved to the extended position from the truck bed;
   e. an upper frame longitudinally aligned over said lower frame and said intermediate frame;
   f. a support panel attached to said upper frame, and;
   g. means for rolling said upper frame longitudinally and directly onto said lower frame or said intermediate frame when said intermediate frame is moved to an extended position from the truck bed, whereby when said intermediate frame is extended from said lower frame and a load placed on said support panel, the load placed onto said support panel is continuously supported by said lower frame or said intermediate frame when said upper frame is selectively moved to a retracted position or an extended position, respectively, from the truck bed.

2. The truck bed extender, as recited in claim 1, further including means to lock said intermediate frame and said upper frame in the retracted position inside the truck bed.

3. The truck bed extender, as recited in claim 1, wherein said support leg is telescopic.

4. The truck bed extender, as recited in claim 1, wherein said intermediate frame includes a rear transverse member with said support leg pivotally mounted to said transverse member, said support leg able to move between a non-blocking position to allow said intermediate frame to be moved between the extended to the refracted position on the truck bed.

5. The truck bed extender, as recited in claim 2, wherein said intermediate frame includes a rear transverse member with said support leg pivotally mounted to said transverse member, said support leg able to move between a non-blocking position to allow said intermediate frame to be moved between the extended to the retracted position on the truck bed.

6. The truck bed extender, as recited in claim 1, wherein said means to attach said lower frame to a truck bed includes a forward pair and a rearward pair of clamping members that extend laterally from said side member to press against the sides of the truck bed to securely hold to said lower frame inside the truck bed.

7. The truck bed extender, as recited in claim 6, wherein said means to lock said intermediate frame in a fixed position on said lower frame is a removable knob insertable into holes formed on said intermediate frame and said upper frame through which said knob extends to lock said intermediate frame to said lower frame.

8. The truck bed extender, as recited in claim 1, further including means to lock said upper frame in a fixed position over said intermediate frame.

9. The truck bed extender, as recited in claim 8, wherein said means to lock said upper frame in a fixed position over said intermediate frame is a longitudinally aligned bar attached to said lower frame and a longitudinally aligned turn rod attached to said upper frame, said bar including a plurality of raised elements and the turn rod including a tongue member that selectively engages said raised elements to lock said upper frame over said lower frame.

10. The truck bed extender, as recited in claim 1, wherein said means for rolling said upper frame over said lower frame is at least two pairs of wheels spaced apart and attached to the opposite sides of said upper frame thereby enabling said upper frame to roll onto said intermediate frame when said upper frame is extended from the truck bed and roll onto said intermediate frame when said upper frame is retracted on the truck bed.

11. The truck bed extender, as recited in claim 4, wherein said means for rolling said upper frame over said lower frame is at least two pairs of wheels spaced apart and attached to the opposite sides of said upper frame thereby enabling said upper frame to roll onto said intermediate frame.

12. The truck bed extender, as recited in claim 6, wherein said means for rolling said upper frame over said lower frame is at least two pairs of wheels spaced apart and attached to the opposite sides of said upper frame thereby enabling said upper frame to roll onto said intermediate frame.

13. A truck bed extender, comprising:
   a. a lower frame disposed inside a truck bed, said lower frame including a pair of hollow side members longitudinally aligned on opposite sides of the truck bed;
   b. means to attach said side members to the truck bed;
   c. an intermediate frame capable of fitting inside and moving longitudinally from the truck bed between a retracted and extended position, said intermediate frame including two lateral members that slide into said side members on said lower frame, and a rearward transverse member;
   d. at least one length adjustable support leg attached to said transverse member, said support leg used to support said intermediate frame on a support surface when moved to the extended position from the truck bed; and,
   e. an upper frame capable of fitting inside the truck bed and being longitudinally aligned over said lower frame and said intermediate frame, said upper frame including two side members, a front transverse member and a rear transverse member, said side members including a pair of wheels mounted thereon to allow said side members on said upper frame to roll directly onto said side members on said lower frame when moved into a retracted position or roll directly onto said lateral members on said intermediate frame when said intermediate frame is extended from said lower frame and said upper frame is moved into an extended position from the truck bed; and,
   f. a support panel attached to said upper frame.

14. The truck bed extender, as recited in claim 13, further including means to lock said intermediate frame and said upper frame in the retracted position inside the truck bed.

15. The truck bed extender, as recited in claim 14, wherein said intermediate frame includes the rear transverse member with said support leg pivotally mounted thereon, said support leg capable of moving between a non-blocking position and an extended position to allow said intermediate frame to be retracted on the truck bed and to support the end of said intermediate frame on a support surface when moved to the extended position.

16. The truck bed extender, as recited in claim 15, further including means to lock said intermediate frame and said upper frame in the refracted position inside the truck bed.

17. The truck bed extender, as recited in claim 13, wherein said means to attach said lower frame to the truck bed includes a forward pair of clamping members and a rearward pair of clamping members, said clamping members extend laterally from opposite said side members to press against the sides of the truck bed to securely hold to said lower frame inside the truck bed.

18. The truck bed extender, as recited in claim 14, wherein said means to attach said lower frame to the truck bed includes a forward pair of clamping members and a rearward pair of clamping members, said forward pair of clamping members and said rearward pair of clamping members extend laterally from said side members to press against the opposite sides of the truck bed to securely hold to said lower frame inside the truck bed.

19. The truck bed extender, as recited in claim 15, wherein said means to attach said lower frame to the truck bed includes a forward pair of clamping members and a rearward pair of clamping members, said forward pair of clamping members and said rearward pair of clamping members extend laterally from said side members to press against the opposite sides of the truck bed to securely hold to said lower frame inside the truck bed.

20. The truck bed extender, as recited in claim 16, wherein said means to attach said lower frame to the truck bed includes a forward pair of clamping members and a rearward pair of clamping members, said forward pair of clamping members and said pair of clamping members extend laterally from said side members to press against the opposite sides of the truck bed to securely hold to said lower frame inside the truck bed.

* * * * *